3,397,059
PHOTOCHROMIC POLYMETHYLMETHACRYLATE ELEMENT ON CONTACT WITH POLYESTER RESINOUS MATERIAL
George Henry Dorion, New Canaan, Guenter Willi Nachtigall, Norwalk, and John Joseph Cerreta, Monroe, Conn., assignors to American Cyanamid Company, Stamford, Conn., a corporation of Maine
No Drawing. Filed July 1, 1964, Ser. No. 379,745
3 Claims. (Cl. 96—87)

ABSTRACT OF THE DISCLOSURE

This invention relates to an article of manufacture comprising (1) a self-supporting substrate carrying thereon (2) a layer of a film-forming thermoplastic resin having a photochromic material intimately intermingled therewith and a polyester resin. More particularly, this invention relates to an article of manufacture comprising (1) a sulf-supporting substrate carrying thereon (2) a layer of a photochromic material-containing, film-forming thermoplastic resin and (3) a polyester resin composed of (a) tetrahydrophthalic anhydride, (b) adipic acid, (c) neopentyl glycol and (d) trimethylolethane or (e) tetrahydrophthalic anhydride, (f) a self-condensed dimer acid, (g) 1,5-pentanediol and (h) trimethylolethane. Still more particularly, this invention relates to an article of manufacture comprising (1) a self-supporting substrate carrying thereon (2) a layer of a film-forming thermoplastic resin having a photochromic material intimately intermingled therewith and (3) a polyester resin, which article of manufacture possess the ability to change color when subjected to ultraviolet light and revert to its original color when removed from said ultraviolet light.

---

The use of self-supporting films for the support of sundry materials to produce various articles which may be used, for example, for photographic purposes, is well known in the art. More particularly, the production of photographic film from a self-supporting material such as cellulose acetate and, for example, a silver halide-gelatin emulsion, has been used in the motion picture industry and other commercial applications wherein the retention of images and other data is desirable. One problem, among many, which exists in commercially available films of this type is the bulkiness and relatively inflexible nature thereof. Additionally, the films now commercially available are relatively weak in that they tend to tear and break when subjected to any substantial degree of handling, usage or bending.

Many different film materials have been developed to eliminate this inflexibility. The films produced toward this end are usually composed of layers of various materials, one of which contains the image-retention media. While these films have generally solved the problem of flexibility, they have done so at the expense of the adhesion of the different layers to one another. The film layers therefore tend to crumble or separate from each other when they are handled continuously over substantial periods of time, thereby materially shortening their useful lifetime.

We have now produced articles of manufacture which have the attractive optical advantages of commercially available photochromic or photographic films, the desirable dimensional stability of the layer type of films mentioned above, and also the ability to stand up to continual use without separating, crumbling or thermally deteriorating. In other words, we have produced articles which have the optical quality of commercially available products, are more resistant to tearing, cracking, breaking, etc. than said products when subjected to ordinary use and wear, have an increased adhesion to the substrate and a reduced brittleness. Our products, which are photochromic in the solid state and have excellent dimensional stability, are further enhanced by the fact that they may be used in existing commercially available photographic instruments without necessitating alteration thereof. Additionally, we have found that there is no "flowering" of the photochromic material, i.e. no rising of the photochromic material to the surface of the thermoplastic layer, in our systems as is evidenced in those of many commercially available materials.

Perhaps more importantly, the photochromic materials, as employed in our novel products, are molecularly distributed throughout the thermoplastic resin layer. This molecular distribution thereby enables our novel articles of manufacture to be utilized for the infinite resolution of data, images or designs, which usages are not permitted by prior art products wherein solutions of dispersed photochromic powders or solutions, are microencapsulated and used as the active media. These articles are inactivated or rendered useless by an intentional or accidental pressure bursting of the capsules, see, for example, U.S. Patent No. 2,953,454.

It is therefore an object of the present invention to provide novel articles of manufacture.

It is a further object of the present invention to provide a novel article of manufacture comprising (1) a self-supporting substrate carrying thereon (2) a layer of a film-forming thermoplastic resin, which resin has a photochromic material intimately dispersed throughout the body thereof and (3) a polyester resin.

It is a further object of the present invention to provide an article of manufacture comprising (1) a self-supporting substrate carrying thereon (2) a layer of a photochromic material-containing, film-forming thermoplastic resin and (3) a polyester resin composed of (a) tetrahydrophthalic anhydride, (b) adipic acid, (c) neopentyl glycol and (d) trimethylolethane or (e) tetrahydrophthalic anhydride, (f) a self-condensed dimer acid, (g) 1,5-pentanediol and (h) trimethylolethane.

These and other objects will become more apparent to one skilled in the art upon reading the more detailed description set forth hereinbelow.

Photochromism

Molecules or complexes which undergo reversible photo-induced color changes are termed photochromic systems. That is to say, in the absence of activating radiation, the system has a single stable electronic configuration which has a characteristic absorption spectrum. When the system is contacted with a certain wave length range of light, the absorption spectrum for the system changes drastically, but when the light source is removed, the system spontaneously reverts to its original state or color or remains colored until subjected to a different wavelength of light.

Photochromic compounds are well known in the art as is the usage thereof in such applications as temporary data storage devices, reflectants for high intensity radiation, and the like. These photochromic compounds generally become colored or change color upon subjection to visible or ultraviolet light and revert to their original color when they are removed from the ultraviolet or visible light and/or stored in the dark. Moreover, many of these known compounds change their color when they are exposed to ordinary sunlight and subsequently revert back to their original color upon removal from the rays of the sun. Various other materials, however, change color only when subjected to a certain degree of irradiation and, as such, sunlight will not affect them. High intensity radiation, such as 10–25 cal./cm.$^2$/sec. or more is necessary in regard to these compounds, while sunlight (0.2 cal./cm.$^2$/sec.) will affect the former.

Photochromism has been observed in inorganic and organic compounds, both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism, is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

(A) Absorption of incident radiation

According to the quantum theory, each absorbed quantum creates one activated molecule and only absorbed radiation can produce a chemical change. Variables which control the number of photons absorbed, include the concentration and extinction coefficient of the photochromic compound, the screening coefficients of other components of the system, and the wavelengths of the incident radiation.

(B) Quantum yield

All excited molecules will not undergo transformation to the activated form, so that the quantum yield will generally be less than unity. Various deactivating processes which compete for the excited molecules include fluorescence, phosphorescence, permanent chemical change and thermal release.

(C) The reverse reaction

In both the forward and reverse reactions, the concentration of the activated form is dependent on the time period, the intensity and the wavelengths of the light, the kinetics of the reverse reactions and the temperatures of the system. The kinetics for the reverse reaction will normally be controlling, however, some reverse reactions are thermally sensitive and are accelerated by heating.

By the terms "photochromic compound," "photochromic additive," "photochromic substance," or "photochromic material," as used in the instant disclosure, are meant compounds, substances, additives or materials which change their transmission or reflectance upon being subject to ultraviolet or visible light and subsequently revert to their original state when removed from said light, or treated with light of a different wavelength.

The articles of manufacture

As mentioned above, our new articles of manufacture are composed of (1) a self-supporting layer, substrate or film of a material, which is preferably transparent, upon which is carried (2) a layer or film of a thermoplastic film-forming resin, which resin has a photochromic material uniformly and intimately dispersed throughout the body thereof and (3) a polyester resin.

The self-supporting substrates which may be used in the production of the articles of manufacture embraced by the present invention may be composed of any material which is capable of forming, or being formed into, a self-supporting base. That is to say, any material which possesses the rigidity and stiffness which enables it to be self-supporting, may be used in forming the substrate of the novel articles of our invention. Examples of materials of this type include resinous products such as, for example, those produced by reacting ethylene glycol with terephthalic acid; cellulose acetate; cellulose acetate butyrate; poly(methyl methacrylate); any commercially available photographic material; synthetic paper materials such as acrylic sheets (U.S. Patent 2,810,646); cellophane and the like. Additionally, such cellulosic materials as paper produced from wood pulp, rags and the like, may be used. Also, we may use glass, ceramic materials, such as tile, metal, such as stainless steel, carbon steel, aluminum, etc., as the supporting member of our novel articles of manufacture.

Examples of film-forming resinous thermoplastic polymers which may be used to form the layer which is carried by any of the above enumerated substrates, include such materials as acrylic and methacrylic polymers, i.e. methyl methacrylate-acrylonitrile copolymers, methyl methacrylate-ethyl acrylate copolymers and the like, styrene polymers, vinyl halide polymers, cellulose triacetates and other esters of cellulose, polyvinyl butyral and the like. These materials may be produced as homopolymers or copolymers thereof with varying amounts of monomers copolymerizable therewith such as styrenes, acrylamides and the like.

Additionally, cyanoethylated cellulosic materials such as those produced from the cellulose of wood pulp or wood fiber, alpha-cellulose flock, viscose, cotton linters, cotton, jute, ramey, linen, and the like in such forms as fibers, yarns, fabrics, raw stock, batting, and the like, may be used. Generally, materials of this type possess, after cyanoethylation by various known procedures, a nitrogen content of as high at 13% and a degree of substitution of up to about 3. A nitrogen content of at least 10% and a corresponding degree of substitution of about 2.3 is generally considered average. Procedures for the production of such materials, as well as the products per se, are shown in U.S. Patents 2,375,847, 2,840,446, 2,786,736, 2,860,946 and 2,812,999.

Any photochromic system may be utilized for incorporation into the thermoplastic film-forming resin without departing from the scope of the present invention. To be more precise, any photochromic system whose color change or photochromic phenomena results from (1) reversible intramolecular hydrogen transfer, (2) molecular rearrangement (valence tautomerization), (3) geometrical rearrangement, (4) dissociation, or (5) a combination of two or more of these processes may be utilized. Therefore, such known photochromic compounds as those of the formulae

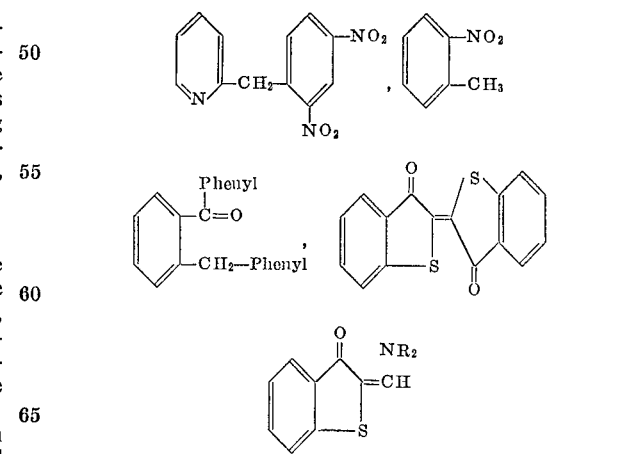

(R=alkyl, aryl, etc.), the indenone oxides, such as those having the formula

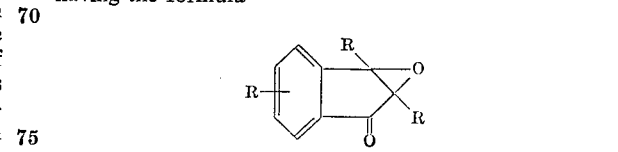

(R=alkyl, aryl, etc.), the spiropyrans, such as those having the formula

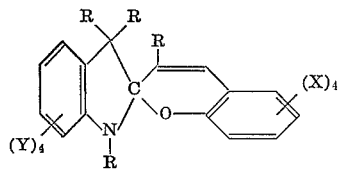

(X and Y=hydrogen, nitro, alkoxy, halo, etc.), (R=hydrogen, alkyl, etc.), i.e. those compounds set forth in copending U.S. application, Ser. No. 239,333, filed Nov. 21, 1962, now U.S. Patent No. 3,212,898; additionally, those photochromic compounds having the formula

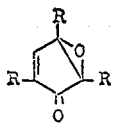

wherein R is substituted phenyl, substituted pyridyl, or a lower alkyl radical and said substituents are hydrogen, lower alkoxy, lower alkyl, nitro, cyano, halo, or alkoxy carbonyl radicals, such as those set forth in copending U.S. application Ser. No. 312,850, filed Oct. 1, 1963, now U.S. Patent No. 3,329,502; those having the formula Ar—N=N—Ar, $Ar_3C$—CN (Ar=aryl); the dithizonates, such as mercury bis-dithizonate and those set forth in copending application, Ser. No. 323,580, filed Nov. 14, 1963, and the like may be used to form our novel products. Inorganic photochromic systems may also be used to produce my novel articles of manufacture. Examples of various inorganic systems include various metal oxides which have been doped with other metal oxides in a manner set forth in copending U.S. application, Ser. No. 262,254, filed Mar. 1, 1963, now U.S. Patent No. 3,314,795. These systems include such photochromic oxide mixtures as $TiO_2$ doped with $Fe_2O_3$, FeO, $Cr_2O_3$, CuO, NiO, $MnO_2$, or $Mn_2O_3$; $Nb_2O_5$ doped with $Fe_2O_3$, FeO, $Cr_2O_3$, CuO, $V_2O_5$, $MnO_2$ or $Mn_2O_5$; $Al_2O_3$ doped with $Cr_2O_3$ or $V_2O_5$; ZnO doped with CuO or $V_2O_5$; $SnO_2$ doped with CuO; or $ZrO_2$ doped with CuO or NiO. In regard to the $TiO_2$, the rutile form of the compound is sufficient, however, the anatase form containing at least 5% of the rutile material is preferred. These photochromic materials contain from about 0.01 to 5.0 mole percent of the doping guest oxide, preferably 0.1 to 2.0 mole percent, based on the number of moles of the host oxide. Other photochromic systems which may be used include $TiO_2$ doped with $Fe_2O_3$ or FeO and NiO or $TiO_2$ doped with $Fe_2O_3$ or FeO and CuO. Here, again, the rutile form of the host compound is satisfactory, but the anatase form containing at least 5% of the rutile material is preferred. When a combination of the different doping oxides is used, amounts ranging from 100:1 to 10:1, preferably 25:1 to 5:1, of the iron oxide to the nickel or copper oxide are satisfactory, the total amount of the mixed oxides still however, being within the range (in mole percent) specified above.

A third class of photochromic inorganic oxide materials which may be used to form the articles of manufacture of the present invention are $TiO_2$ reacted wtih $MoO_3$ or $WO_3$. These materials are produced in mole ratios of about 1 to 15 mole percent of $TiO_2$ to about 25 to 1 mole percent of $MoO_3$ or $WO_3$. The preferred mole ratios range from about 1:4 to about 12:1, respectively. The $TiO_2$ component may be in either the rutile, anatase, or mixed phase form, and in place of $TiO_2$ other metal oxide components may be used, such as, for example, ZnO, $ZrO_2$, $SnO_2$ and $GeO_2$ in the same mole ratio given above for $TiO_2$.

Further examples of solid state photochromic additives which may be used to form the novel articles of manufacture of the present invention include: N-4-hydroxy-benzylideneaniline, 2-3-diphenyl-1-indenone oxide, m-chloro-N-o-nitrobenzylideneaniline, p-salicylideneaminobenzoic acid, N-salicylideneaniline, N-salicylidene-p-anisidine, N-salicylidene-m-toluidine, N-o-nitrobenzylidene-p-phenetidine, anisaldehyde phenylhydrazone, 1-(p-methoxyphenyl)-1-penten-3-one semicarbazone, cinnamaldehyde thiosemicarbazone, 2-(2,4-dinitrobenzyl)pyridine, N-(3-pyridyl)syndnone and the like.

Any amount of the photochromic material may be added to the film-forming, thermoplastic resin depending upon the intensity of the color of the composition desired upon irradiation thereof. This also depends, of course, on the maximum solubility of the photochromic material in the film-forming resin. Generally, however, amounts of photochromic material ranging from about 0.01% to about 10%, by weight, based on the weight of the resinous film-forming, thermoplastic polymer are considered sufficient.

Physical blending of the thermoplastic resin, photochromic substance, and/or the polyester may be conducted by any known procedure such as by utilizing a ball mill, a tumbler mixer, hot rolls, emulsion blending techniques, Banbury mixers, Waring Blendors, and the like. Another procedure which may be employed is known as a devolatilization-extrusion method, wherein separate streams of solutions of the selected media and photochromic material are subjected to mixing, compounding, devolatilization and extrusion in commercially available devices. In the devolatilizer-extruder, the mixture is worked in a chamber under heat and vacuum so that new surfaces of the mixture are continuously and rapidly exposed to vacuum to remove the solvent before extruding the product.

The increased adhesion and flexibility of our novel articles of manufacture are attained by adding a polyester resin to the self-supporting substrate, as such, or as a blend with the film-forming thermoplastic resin and photochromic material. That is to say, we have found that we can attain articles of manufacture having increased flexibility and greater resistance to deterioration, such as separation of layers, by incorporating a polyester resin into the article as a layer drawn down on the substrate upon which is coated the thermoplastic film-forming resin containing the photochromic material or as a blend, in solution, with the photochromic material and the film-forming thermoplastic resin.

Generally, any polyester resin may be utilized for the purpose of increasing the flexibility and deterioration resistance of our novel articles of manufacture. That is to say, any polyester resin which is produced by reacting a polycarboxylic acid, or anhydride, with a polyhydric alcohol, may be used. The polyesters may be thermoplastic or thermosetting, the thermosetting polyester being prepared by the utilization of an active component containing $\alpha,\beta$-ethylenic unsaturation, and the thermoplastic polyester being prepared by utilizing a non-polymerizable polycarboxylic acid, i.e., one which contains only benzenoid unsaturation or is saturated. The polyester resins may be produced according to any known procedure such as, for example, that set forth in U.S. Patent No. 2,443,740. A typical procedure comprises reacting the ingredients, in solution, by heating them to a temperature of from about 20° C. to about 150° C. in an inert atmosphere and in a suitable vessel from which the water of esterification can escape. Various modifications in the processing conditions may be introduced depending upon the particular properties desired in the resultant polyester. These modifications are well within the scope of those skilled in the art.

Although all polyester resins are applicable in the formation of the articles of manufacture of our invention, we have found two specific polyester resins which preferably may be used to produce our novel products. These two polyester resins have been found excellent in regard to producing the properties in the resultant articles as specified above as well as in producing articles having a high degree of optical clarity.

These two polyester resins are composed of the following ingredients:

Polyester resin No. 1

| | Parts |
|---|---|
| (a) Tetrahydrophthalic anhydride | 200–150 |
| (b) Adipic acid | 10–60 |
| (c) Neopentyl glycol | 160–120 |
| (d) Trimethylolethane | 10–50 |

Polyester resin No. 2

| | Parts |
|---|---|
| (e) Tetrahydrophthalic anhydride | 200–150 |
| (f) A self-condensed dimer acid | 50–100 |
| (g) 1,5-pentane diol | 160–120 |
| (h) Trimethylolethane | 10–50 |

It is hereby stressed that the total amount of the first two components in each polyester, i.e., components (a) and (b) and components (e) and (f), and conversely, the second two components of each polyester, i.e., components (c) and (d) and components (g) and (h), should each total approximately 50%, by weight, based on the total weight of the polyester, of the individual polyester of which they are components.

In the preparation of these two polyester resins, it is desirable to utilize at least a stoichiometric amount of hydroxyl groups to carboxyl groups, however, an excess of hydroxyl groups, i.e., up to about 25% excess over the stoichiometric amount of carboxyl groups, is preferably employed. The excess alcoholic materials however, remain unreacted at the completion of the polyester production and do not enter into the final compositions. The excess materials may then preferably be stripped off to yield the final polyesters.

Polyester resins 1 and 2, specified above, and other methods for the production thereof, are more fully set forth in copending application, Ser. No. 374,618, now abandoned (Case 19,202) to Donaldson and Morris. It is stressed however, that the two polyester resins per se and their corresponding methods of production form no part of the instant invention other than their use as a layer (alone or as a mixture with the thermoplastic resin) of our novel articles of manufacture.

The self-condensed dimer acid mentioned as component (f) in polyester resin number 2 is generally a $C_{36}/C_{54}$ dimer acid, the ratio of each being from about 2:1, respectively, which self-condenses in said ratio and which is currently commercially available under the designation Empol 1024.

As mentioned above, either of the polyester resins can be added to constitute a component of our novel articles of manufacture by merely forming a film thereof on the self-supporting substrate such as by knife-blade, gravure, or air-knife techniques well known to those skilled in the art. Alternatively and preferably, the polyester resin can be added as a solution in, for example, toluene, up to a 40% solids level, to a solution of the thermoplastic resin and the photochromic material. The resultant blend can then be drawn down on the self-supporting substrate by any of the above specified methods. The solvent is then allowed to evaporate from the film so as to produce our novel articles of manufacture.

Plasticizers such as dioctyl phthalate, dimethyl phthalate, diethyl phthalate, diisobutyl phthalate, dibutyl sebacate, di-(2-ethylhexyl)adipate and the like, in concentrations of up to about 10%, may also be added to the polyester resins in order to create a somewhat softer or more flexible material without detracting from the properties specified above.

The amount of polyester resin employed is that necessary to give a film or a layer of at least 0.1 mil to 30 mils in thickness or, when added with the thermoplastic, film-forming resin, amounts ranging from about 1:2 to 4:1 of the thermosetting resin to the polyester, respectively, may be employed.

It is also possible to lengthen the life of our novel articles of manufacture by incorporating ultraviolet light stabilizers into the compositions. In this manner, the photochromic life of the added photochromic material portion of the article is lengthened by preventing an extraneous amount of ultraviolet light from coming into contact therewith. When absorbers of this type are added, amounts up to about 20%, by weight, based on the weight of the polymeric media, may be used, the exact amount and absorber, of course, being selected so as not to exclude the wavelengths of ultraviolet required for the photochromic phenomena to occur.

The layer of the mixture of thermoplastic film-forming resin and the photochromic material, with or without the polyester resin component therein, may be added to the self-supporting substrate by any known film deposition technique. As mentioned above, the layers may constitute films cast from a solvent solution of the resin and photochromic material by drawing them down onto the self-supporting substrate and allowing the solvent to evaporate either at room temperature or by the application of heat. Alternatively, however, the layer of thermoplastic resin and photochromic material may be pre-formed and added to the polyester coated substrate and pressed together with the coated substrate, preferably under pressure.

The thickness of the thermoplastic resin film which is applied to the self-supporting substrate depends primarily upon the application to which the resultant article is to be subjected. Generally, however, we have found that a thickness ranging from about 0.1 mil to about 10 mils is sufficient for most purposes and therefore thicknesses of this degree are generally sufficient.

The novel articles of manufacture of the present invention may be utilized for the production of variable-transmission films which find use as memory devices, optical analogue computers, temporary data storage devices, temporary oscillographs, temporary photographic proofs and transparencies, light storage, optical masks and the like, decorative materials such as package wrappings, advertising articles and the like, photocopying devices, such as permanent positive producing instruments, temporary negatives, temporary positives and the like.

If the resultant article produced is transparent, the transparency may be eliminated by spraying the back of the self-supporting substrate with a pigment containing material so as to render the back of the film opaque. This results in a variable-reflective film. A preferred type of article, however, is the transparent systems wherein the optical clarity governs the end use thereof and is generally necessary.

The following examples are set forth for purposes of illustration only and are not to be construed as limitations on the present invention except as set forth in the appended claims. All parts and percentages are by weight unless otherwise specified.

Example 1

A 32% solution of poly(methyl methacrylate) (solids content) in methyl ethyl ketone/methyl isobutyl ketone (82/18) is prepared. To 100 parts of this solution is added 25 parts of the polyester resin specified as number 1, above, in a 40% solution in toluene. The polyester is composed of 190 parts of tetrahydrophthalic anhydride, 18.5 parts of adipic acid, 143 parts of neopentyl glycol and 20 parts of trimethylolethane. One percent (by weight) of 1′,3′,3′-trimethyl-6-nitro-spiro(2H-1-benzopyran-2,2′-indoline) is then added. The overall solids content is 35.5%. The resultant mixture is then cast to an 0.8 mil thickness on a commercially available film of polyethylene glycol terephthalate at room temperature. The solvent is allowed to evaporate and a transparent, self-supporting film of the indoline, poly(methyl methacrylate) and polyester coated terephthalate results. Upon subjection to ultraviolet light of 365 mμ wavelength, the article changes in color from water white to blue. When removed from the ultraviolet light, the article reverts to its water white color. The color change cycle can be repeated hundreds of times without deterioration. Upon subjection of the article to a bend test wherein it is bent over 180°, 60 bends can be achieved before separation or flaking of the poly(methyl methacrylate) film from the base substrate. A minimum of 15 bends is satisfactory. A film of poly(methyl methacrylate) of the same thickness on the same base substrate but without the polyester fails (flakes and separates) the bend test after 8 bends. A piece of commercially available 35 mm. photographic (silver emulsion) film begins to tear after 20 bends when subjected to the same test.

Example 2

A 32% solids solution of poly(methyl methacrylate) in methyl ethyl ketone/methyl isobutyl ketone (82/18) is prepared. A second solution of polyester resin number 1, as specified in Example 1, in toluene is prepared at a solids content of 40%. The polyester solution is cast to an 0.5 mil film on a commercially available film of polyethylene glycol terephthalate by evaporation of the toluene at 50° C. To the poly(methyl methacrylate) solution is then added 2%, by weight, of 1',3',3'-trimethyl-5', 6 - dinitro - 8 - methoxy-spiro(2H-1-benzopyran-2,2'-indoline). The resultant solution is then cast to an 0.5 mil thickness on the polyester coated terephthalate and allowed to dry at room temperature. An article is recovered which, when subjected to ultraviolet light, turns from colorless to blue. The water-white color returns upon removal of the light. The article passes the bend test described in Example 1 (50 bends before flaking).

Example 3

The procedure of Example 1 is again followed except that an equivalent amount of polyester resin number 2, specified above, is substituted for the polyester used therein. The polyester is composed of 190 parts of tetrahydrophthalic anhydride, 75 parts of $C_{36}/C_{54}$ dimer acid, ratio of 2:1, respectively, 143 parts of 1,5-pentanediol and 20 parts of trimethylolethane. The resultant article is photochromic and can be subjected to 56 bends before the polyacrylate layer begins to flake or separate from the base substrate.

Example 4

Following the procedure of Example 1, a 10% solids solution of polystyrene in methylene chloride containing 1%, by weight, based on the weight of the polymer, of 1',3',3' - trimethyl-6-nitro-spiro(2H-1-benzopyran-2,2'-indoline) and 20% of polyester resin number 1 (as specified in Example 1) is cast to a 1 mil thickness on a strip of commercially available polyethylene glycol terephthalate. The casting passes the bend test (48 bends) while a similar casting without the polyester fails (11 bends). The article changes from colorless to deep blue upon subjection to ultraviolet light.

Example 5

A ten percent solids solution is produced by blending 90 parts of a powdery, commercially available cyanoethylated cellulose (nitrogen content—11.0%; degree of substitution—2.8), 10 parts of 1',3',3'-trimethyl-6-nitro-spiro(2H-1-benzopyran-2,2'-indoline), 20 parts of polyester resin number 1 (as specified in Example 1) and acetone in a Waring Blendor. The resultant solution is then cast on a thick (8 mils) sheet of commercially available polyethylene glycol terephthalate at room temperature. The resultant article turns from colorless to deep blue when subjected to ultraviolet light and passes the bend test (52 bends). A similar article without the polyester fails the test after 6 bends.

Following the procedure of Example 1, various photochromic compound-containing film-forming thermoplastic resins were cast on various self-supporting substrates. The results of these castings are set forth hereinbelow in Table I. In each instance the polyester resin used was either that of Example 1 or Example 3.

TABLE I

| Ex. | T.P. Resin | Polyester of Ex. No. | Photochromic Material | Percent | Substrate | Casting Method of Ex. No. | Color Change | Bend Test |
|---|---|---|---|---|---|---|---|---|
| 6 | MM/EA | 3 | ETCP | 1 | Ceramic tile | 1 | Colorless to red | |
| 7 | CC | 1 | PTPH | 2 | Glass | 2 | Orange to grey | |
| 8 | PS | 3 | NPS | 10 | PMMA (1 mil thick) | 1 | Blue to green | Passed. |
| 9 | PMMA | 1 | TNMS | 3 | Acrylic sheet,[1] thickness 1 mil | 2 | Colorless to blue | Do. |
| 10 | PS | 1 | PTAP | 5 | PEGTP [4] | 2 | Orange to blue | Do. |
| 11 | PMMA | 3 | TDMS | 1 | Optical grade PEGTP [4] | 1 | Colorless to blue | Do. |
| 12 | PMMA | 3 | Same as Ex. 1 | 1 | Same as Ex. 7 | 1 | ----do---- | Do. |
| 13 | PMMA [3] | 3 | ----do---- | 1 | 35 mm. photographic CAF | 1 | ----do---- | Do. |
| 14 | PVC | 1 | TiO₂ doped with 0.2% Fe₂O₃ | 10 | Stainless steel | 2 | White to tan | |
| 15 | PMMA [2] | 3 | Same as Ex. 1 | 5 | PEGTP [4] | 1 | Colorless to blue | Do. |
| 16 | PMMA | 1 | 2,3-DP-1-IE | 1 | PEGTP [4] | 1 | White to pink | Do. |

[1] U.S. Patent No. 2,810,646.
[2] 20% solids in methyl ethyl ketone-methyl isobutyl ketone (75/25).
[3] Cast from benzene.
[4] Commercially available material; T.P.=thermoplastic; MM/EA=methyl methacrylate-ethyl acrylate copolymer (96/4); CC=cyanoethylated cellulose; PS=polystyrene; PMMA=poly(methyl methacrylate); PVC=poly(vinyl chloride); ETCP=2,3-epoxy-2,3,5-triphenylcyclopent-4-en-1-one; PTPH=tris[(phenylazo)thioformic acid 2-phenyl hydrazidato]-Bi (III); NPS=n-(3-pyridyl)sydnone; TNMS=1',3',3'-trimethyl-6-nitro-8-methoxy-spiro(2H-1-benzopyran-2,2'-indoline); PTAP=bis-[(phenylazo)thioformic acid 2-phenyl hydrazidato]Hg(II); TDMS=1',3',3'-trimethyl-5',6-dinitro-8-methoxy-spiro(2H-1-benzopyran-2,2'-indoline); 2,3-DP-1-IE=2,3-diphenyl-1-indenone epoxide; PEGTP=polyethylene glycol terephthalate; CAF=cellulose acetate film.

Example 17

The product of Example 1 is sprayed with white stencil ink. The transparent product becomes opaque. An excellent image is produced when a photographic negative is placed on the poly(methyl methacrylate) side of the article and ultraviolet light is contacted therewith.

We claim:

1. An article of manufacture comprising (1) a self-supporting, flexible substrate comprising polyethylene glycol terephthalate carrying on one side thereof (2) a layer of a polymer of an methyl methacrylate having a photochromic material dispersed throughout the body thereof and (3) a polyester resin selected from the group consisting of (X) a resin produced from (A) tetrahydrophthalic anhydride, (B) adipic acid, (C) neopentyl glycol and (D) trimethylol propane and (Y) a resin produced from (E) tetrahydrophthalic anhydride, (F) a self-condensed dimer acid, (G) 1,5-pentanediol and (H) trimethylol ethane, said polyester resin being present in said article in a position selected from the group consisting of (a) dispersed throughout said methyl methacrylate polymer in a concentration ranging from about 1:2 to about 4:1 of said polymer to said polyester resin, respectively, and (b) imposed as a 0.1 mil to 30 mil thick layer between said substrate and said methyl methacrylate polymer layer.

2. An article of manufacture according to claim 1 wherein said polyester resin is present dispersed throughout said methyl methacrylate polymer layer.

3. An article of manufacture according to claim 1 wherein said substrate is coated on the side opposite said side carrying said methyl methacrylate polymer layer with a pigmented, reflective, opaque layer.

References Cited

UNITED STATES PATENTS

| | | | |
|---|---|---|---|
| 2,698,239 | 12/1954 | Alles et al. | 96—87 |
| 3,033,680 | 5/1962 | Milton et al. | 96—94 |
| 2,921,407 | 1/1960 | Wagner et al. | 96—89 |
| 3,134,674 | 5/1964 | Brown | 96—89 |
| 3,212,898 | 10/1965 | Cerreta | 96—90 |
| 3,215,529 | 11/1965 | Linquist et al. | 96—90 |

OTHER REFERENCES

Fligor et al.: "Resinous Plasticizers from Sebacic Acid," Ind. and Eng. Chem., vol. 37, No. 5, pp. 504–508, 260/873 (May, 1945).

NORMAN G. TORCHIN, *Primary Examiner.*

C. E. DAVIS, *Assistant Examiner.*